(12) United States Patent
Lohmann et al.

(10) Patent No.: US 7,741,595 B2
(45) Date of Patent: Jun. 22, 2010

(54) LIGHT GRID FOR DETECTING OBJECTS IN A MONITORED ZONE

(75) Inventors: Lutz Lohmann, Olching (DE); Gennadiy Tkach, Munich (DE); Joachim Koperski, Neubiberg (DE)

(73) Assignee: Leuze Lumiflex GmbH & Co. KG, Fuerstenfeldbruck (DE)

( * ) Notice: Subject to any disclaimer, the term of this patent is extended or adjusted under 35 U.S.C. 154(b) by 0 days.

(21) Appl. No.: 12/000,790

(22) Filed: Dec. 17, 2007

(65) Prior Publication Data

US 2008/0156968 A1 Jul. 3, 2008

(30) Foreign Application Priority Data

Dec. 15, 2006 (DE) .................. 10 2006 059 322

(51) Int. Cl.
 *G06M 7/00* (2006.01)
(52) U.S. Cl. ....................... 250/221; 340/556
(58) Field of Classification Search ................ 250/221, 250/222.1; 340/555–557
See application file for complete search history.

(56) References Cited

U.S. PATENT DOCUMENTS

| 5,130,532 | A * | 7/1992 | Clemens .................. 250/221 |
| 2004/0128027 | A1* | 7/2004 | Groll et al. .............. 700/245 |
| 2005/0211883 | A1* | 9/2005 | Lohmann ................ 250/221 |

FOREIGN PATENT DOCUMENTS

| DE | 39-39-191 | A1 | 5/1991 |
| DE | 196 13 940 | A1 | 10/1997 |
| DE | 102004022812 | A1 * | 5/2004 |
| DE | 103 23 324 | A1 | 12/2004 |
| DE | 103 41 007 | A1 | 4/2005 |
| DE | 103 50 927 | A1 | 6/2005 |
| DE | 10 2005 050 979 | A1 | 5/2006 |

OTHER PUBLICATIONS

English Machine Translation for DE 102004022812 A1 filed May 2004.*
German Office Action dated Jan. 2, 2008, issued in DE 10 2006 059 322.7-52.

* cited by examiner

*Primary Examiner*—Georgia Y Epps
*Assistant Examiner*—Francis M Legasse, Jr.
(74) *Attorney, Agent, or Firm*—Venable LLP; Robert Kinberg; Kyle D. Petaja

(57) ABSTRACT

A light grid detects includes a number of light emitting transmitters. The transmitted light rays of the individual transmitters are imprinted with a code that characterizes the transmitted light rays. The transmitters are activated cyclically and successively. Corresponding receivers aligned with the transmitters form transmitter/receiver pairs. The receivers are activated continuously for reception of the transmitted light rays. An evaluation unit coupled to the receiver outputs generates an object detection signal in dependence on the signals received at the receiver outputs. The received signals are conducted in parallel to evaluation unit inputs. Only the received signals associated with the active transmitter are recorded and stored in the evaluation unit by muting the inputs onto which the signals received by the remaining receivers are conducted. The correctness of the codes transmitted by the transmitters and their sequence are checked in the evaluation unit by evaluating the stored received signals.

18 Claims, 2 Drawing Sheets

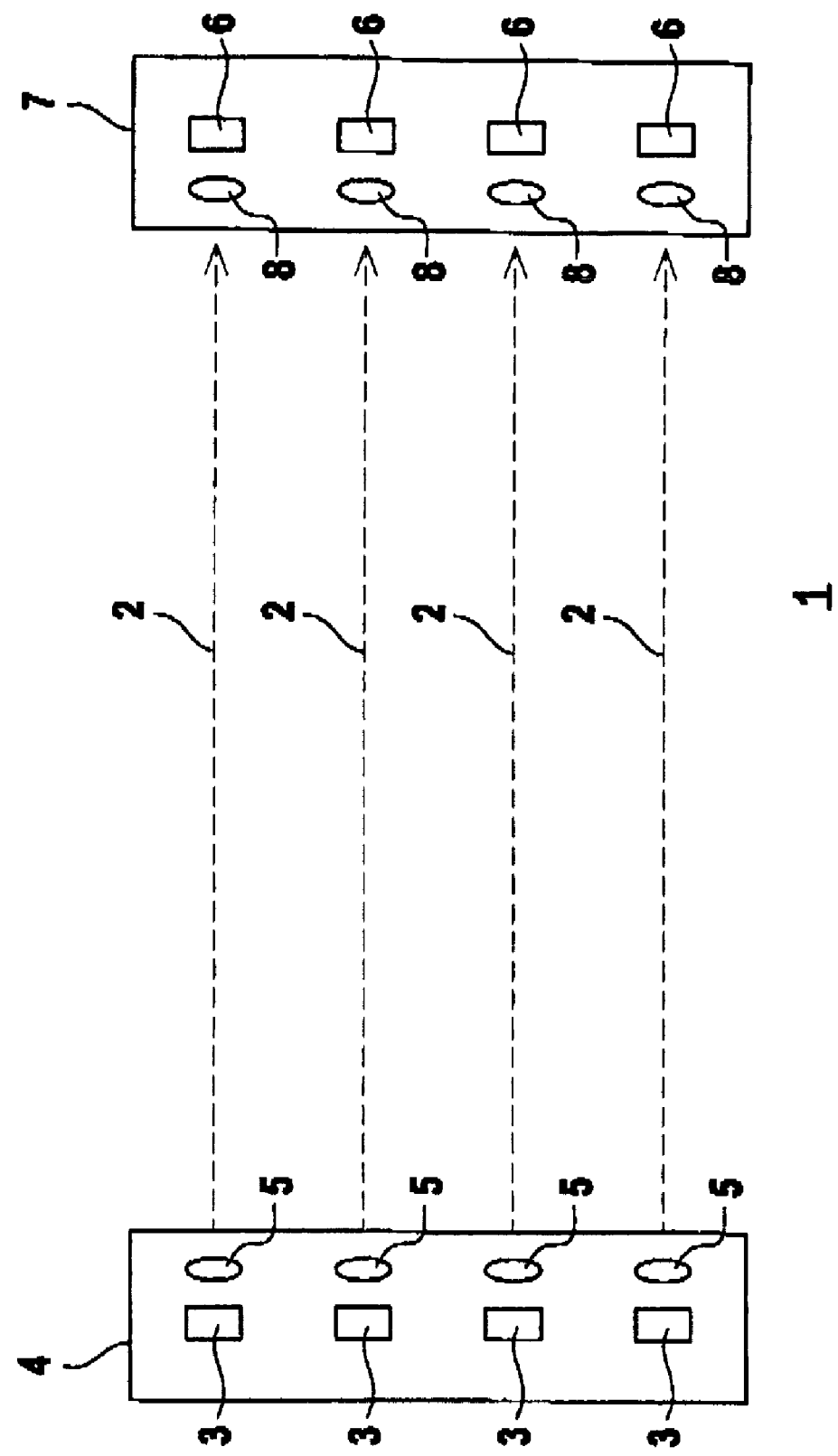

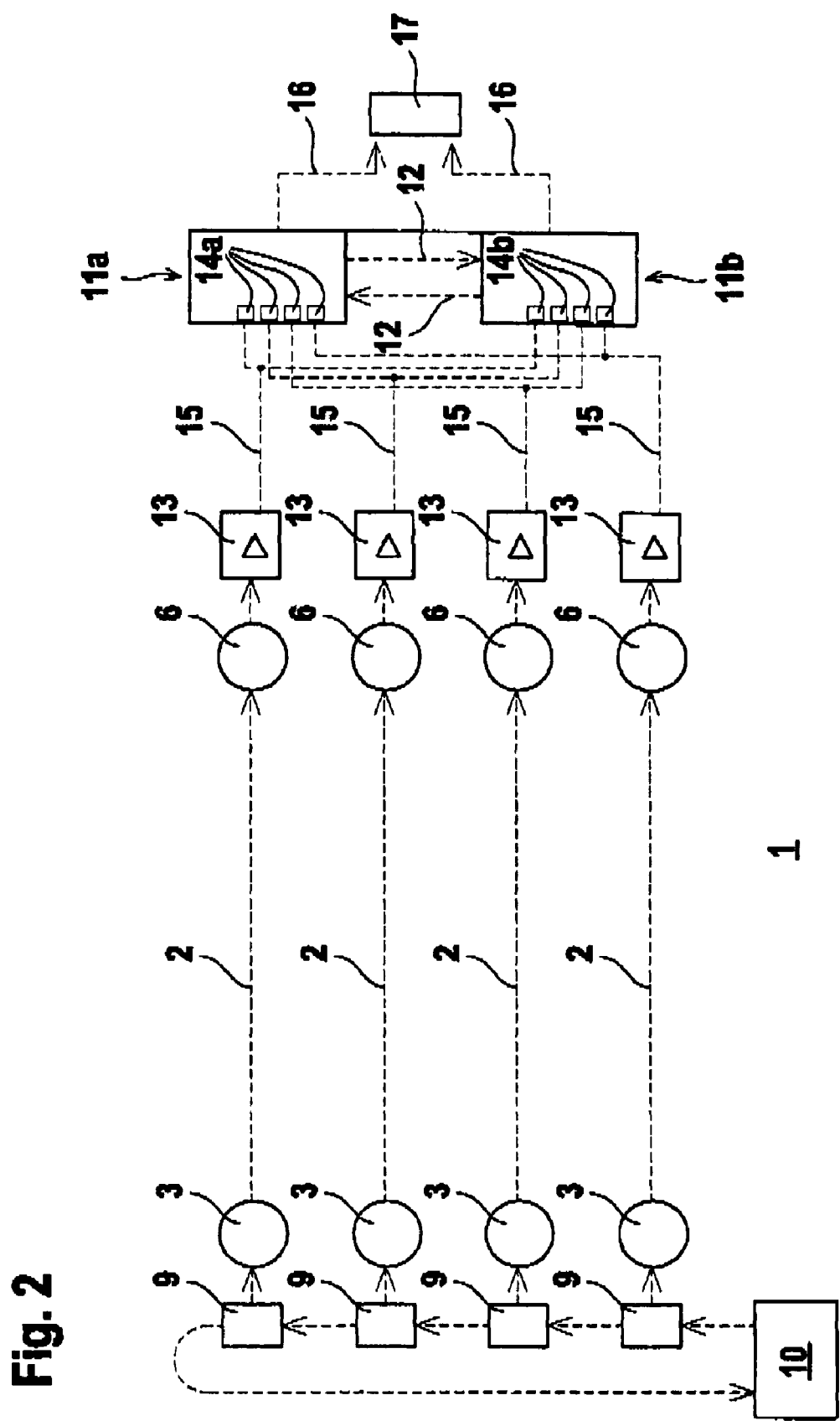

LIGHT GRID FOR DETECTING OBJECTS IN A MONITORED ZONE

CROSS-REFERENCE TO RELATED APPLICATION

This application claims the priority of German Patent Application No. 10 2006 059 322.7, filed on Dec. 15, 2006, the entire content of which is incorporated herein by reference.

BACKGROUND

The invention relates to a light grid for detecting objects within a monitored zone. Such a light grid is know to include a predetermined number of transmitters for emitting light rays, as well as receivers, wherein a beam axis if formed with respectively one transmitter and a receiver assigned to this transmitter. An evaluation unit generates an object detection signal in dependence on the signals received and present at the receiver outputs.

A light grid of this type is disclosed in German Patent document DE 39 39 191 A1. The light grid described therein is provided with a transmitter in the form of infrared transmitting diodes arranged in a row, which are activated one after another periodically and cyclically and emit pulse-pause modified pulses with an identifier. The identifier of a selected infrared transmitting diode differs from the identifier of the remaining infrared transmitting diodes. The receiver is formed with a corresponding row of periodically and cyclically activated photodiodes, clocked by a free running oscillator, wherein each photo diode is assigned to one of the infrared transmitting diodes. A signal "protective zone not free" is generated in an evaluation unit if at least one light beam from the transmitter to the receiver is interrupted. The evaluation unit furthermore synchronizes the cyclical activation of the photodiodes in the receiver with that of the transmitter, based on the identifier received by the selected infrared transmitting diode.

The transmitters for this light grid are activated cyclically, one after another, via a feedback shift register. To ensure a failsafe operation, the correct operation of this shift register is checked with the aid of an integrated error-detection circuit.

The receivers are also cyclically activated with the aid of shift registers, wherein the function of the shift register is checked in the evaluation unit with a two-channel design.

The disadvantage of this light grid is that it can only be synchronized to the selected transmitter, which transmits an identifier that differs from the identifier imprinted on the light rays transmitted by all other transmitters. With a light grid having a muting and blanking function, predetermined beam axes that are not used for the object detection are typically blanked out. These beam axes can or even must be continuously interrupted. For that reason, the beam axis of the selected transmitter for the light grid according to German patent document DE 39 39 191 A1 generally cannot be used to form blanking or muting zones since it can otherwise no longer be used for synchronizing the light grid, meaning a light grid operation would no longer be possible.

A further disadvantage of this light grid requires an undesirably complex circuitry for ensuring a failsafe operation, meaning for the error monitoring necessary when using the light grid in the area of safety technology.

SUMMARY

It is therefore an object of the present invention to provide a light grid of the aforementioned type, which ensures an error-free operation with low structural expenditure.

The above and other objects are accomplished according to the invention wherein there is provided, in one embodiment, a light grid for detecting objects within a monitored zone, comprising: a number of transmitters to emit light rays, the transmitted light rays of the individual transmitters being imprinted with a code that characterizes the light rays emitted by the respective transmitters, the transmitters being activated cyclically and successively; corresponding receivers respectively aligned with the transmitters to form transmitter/receiver pairs, each pair defining a beam axis, the receivers being activated continuously for reception of the transmitted light rays, each receiver having a receiver output and producing a received signal at the output; an evaluation unit coupled to the receiver outputs. The evaluation unit generating an object detection signal in dependence on the signals received and present at the receiver outputs, the received signals being conducted in parallel to separate inputs of the evaluation unit, wherein respectively only the signals received at the receiver associated with the active transmitter are recorded and stored in the evaluation unit by muting the inputs onto which the signals received by the remaining receivers are conducted, and the correctness of the codes transmitted by the transmitters and their sequence are checked in the evaluation unit by evaluating the stored received signals.

With the light grid according to the invention, all safety-relevant functions are integrated into the evaluation unit on the receiver side, so that a failsafe operation of the light grid is ensured with less complex circuitry, which makes it possible to use this light grid in the area of safety technology.

One advantage of the light grid according to the invention is that it is not necessary to have a secure activation and code generation for the individual transmitters. The activation circuit on the transmitter side thus can have a correspondingly simple and cost-effective layout.

This simple layout of the transmitter circuit is made possible, in particular, by assigning a separate code generator to the individual transmitters, which imprints the transmitted light rays from the individual transmitter with unambiguous, individual codes. The evaluation unit for the light grid on the receiver side then checks whether these codes are correctly received in the individual receivers, respectively assigned to a transmitter, and whether the sequence for the received codes is correct, meaning whether it corresponds to the sequence in which the individual transmitters emit the light rays imprinted with the individual codes. As a requirement for this, the individual codes must be stored in the evaluation unit. The codes are therefore advantageously input into the evaluation unit prior to the activation of the light grid by programming them in or teaching them in during a calibration operation.

With the light grid according to the invention, the receivers are simultaneously activated and the signals received at the receivers are read into the evaluation unit in a parallel operation and via separate inputs. To ensure that only the signals received at the associated receiver are respectively evaluated when a specific transmitter is activated, only that evaluation unit input is activated in the evaluation unit to which the signals received from the associated transmitter are conducted, whereas all other evaluation unit inputs to which the signals received at the remaining receivers are conducted are muted.

Another advantage of this circuit layout on the receiving side is that complex shift register circuits can be omitted, which are required for known light grids in order to activate the receivers cyclically and successively.

Since the signals received at the receivers without shift register circuits or the like can be read directly into the evaluation unit, only a few lines are required which results not only in a cost saving, but also leads to increased EMV jamming resistance.

The evaluation unit must realize an error-free evaluation of the received signals to meet the requirements for using the light grid in the area of safety technology. For this, the evaluation unit advantageously has a two-channel design, wherein it is particularly advantageous if the evaluation unit is composed of two micro-controllers that monitor each other.

The safety-relevant functions of the light grid can thus be implemented into the software for the micro-controllers. Hardware in the form of two micro-controllers has an especially simple design that is not subject to malfunction.

The signals received at the receivers are read parallel into the two micro-controllers, via the micro-controller ports that can be operated both as inputs and as outputs. For this, the micro-controller input is switch controlled to ground potential, resulting in the corresponding receiver outputs also being switched to ground potential.

The muting of the ports can occur internally in the micro-controllers or via separate micro-controller ports. In the latter case, the ports can be made more dynamic in that these function alternately for reading in the received signals or for muting additional ports, thereby further increasing the error protection, so that a sticking, meaning a malfunction of the individual ports can be discovered.

One essential advantage of the muting of micro-controller ports and/or the inputs of the evaluation unit is that interconnections between the lines for supplying the received signals and the evaluation unit and/or the two micro-controllers do not result in malfunctions of the light grid. The only evaluation unit input activated is the one to which the signals received at the receiver that is assigned to the activated transmitter are conducted. All other evaluation unit inputs are muted. The reading in and evaluation of a received signal at an incorrect input, for example as a result of an interconnection between inputs, is therefore avoided. If such interconnection is at the line used for currently reading in the received signals, then no code is received and a corresponding error message is generated, meaning the system changes to the safe state.

Another essential advantage of the light grid according to the invention is that it need not be synchronized only via a predetermined beam axis, but can be synchronized via different beam axes. This results from the fact that different codes are imprinted onto the light rays transmitted by the transmitter, which allow a clear identification of the individual beam axes in the evaluation unit. As a result, each beam axis can be used for synchronizing the light grid, thereby considerably increasing the availability.

In order to synchronize the light grid, it is particularly advantageous if only one optional input of the evaluation unit is activated for reading the signals received at a receiver into the evaluation unit. This activation state is maintained until the code of the associated transmitter is received at the input. Following this, all inputs of the evaluation unit, to which receiving signals from the receivers are conducted, are then activated cyclically and individually one after another, with the timing of the transmitter activation.

If the light grid is operated in the blanking mode, for example, so that the receiver initially selected for the synchronization cannot receive the associated code from the transmitter because the beam axis is continuously interrupted by an obstacle, then another receiver can be selected for the synchronization of the light grid, following a preset time interval.

BRIEF DESCRIPTION OF THE DRAWINGS

These and other features and advantages of the invention will be further understood from the following detailed description of various embodiments with reference to the accompanying drawings showing in:

FIG. 1: A schematic representation of mechanical and optical components for a light grid; and FIG. 2: A schematic representation of the electronic and optoelectronic components of the light grid according to FIG. 1.

DETAILED DESCRIPTION

The diagram in FIG. 1 shows the optical-mechanical configuration of a light grid 1 for detecting objects in a monitored area. The light grid 1 comprises a row of transmitters 3 that are installed inside a first casing 4 for emitting light rays 2, wherein the transmitters 3 may be light-emitting diodes. Each transmitter 3 is followed by a transmitting optic 5 in the form of a lens for forming a beam with the transmitted light rays 2. The light grid 1 furthermore comprises a row of receivers 6 that are integrated into a second casing 7. Each receiver 6 is preceded by a receiving optic 8 in the form of a lens, which functions to focus the arriving light rays 2 onto the receiver 6.

The casings 4 for the light grid 1 are arranged at opposite edges of the monitored area. The transmitters 3 inside first casing 4 and the receivers 6 in second casing 6 are respectively arranged equidistant to each other, so that the transmitted light rays 2 emitted by a transmitter 3 can impinge on an associated receiver 6 if the monitored area is clear. These transmitter and receiver pairs form individual beam axes for the light grid 1, wherein the light grid 1 in the present case has four beam axes, meaning four transmitter/receiver pairs.

FIG. 2 shows the electronic and optoelectronic components of the light grid 1 according to FIG. 1. For the circuit layout of the light grid 1 on the transmitting side, a code generator 9 is assigned to each transmitter 3. With the aid of the respective code generators 9, a code is imprinted onto the transmitted light rays 2 of the respectively associated transmitter 3, wherein the code generator 9 is integrated into a processor. The codes for the individual transmitters 3 differ, so that the beam axes can be identified clearly with the aid of the codes.

The individual transmitters 3 are activated cyclically and successively with the aid of a start-up circuit 10, with predetermined transmitter timing. The beam activation is respectively passed on via a beam-activation signal coming from the previously activated beam, meaning the processor for the transmitter 3 of one beam axis activates the transmitter 3 for a following beam axis. The activation period for the individual transmitters 3 is respectively stored in the processors for the transmitters 3. Even if the light grid 1 is used in the area of personal protection, meaning in the area of safety technology, a non-tested control unit on the transmitter side can be used because, as shown in the following, the circuit layout on the receiver side takes over all safety functions for ensuring the required safety level.

The circuit on the receiver side comprises an evaluation unit with a two-channel design for an error-free evaluation of the signals that are received and present at the receiver 6 outputs. In the present case, the evaluation unit includes two identically designed micro-controllers 11a, 11b that mutually monitor each other, wherein the micro-controllers 11a, 11b are connected via lines 12. Alternatively, a single micro-controller can also be provided as the evaluation unit, which is checked by a monitoring unit forming a monitoring channel.

A separate amplifier 13 is arranged downstream of each receiver 6. With the aid of the amplifiers 13, digital signal levels can be generated for the received signals, which can be evaluated directly in the micro-controllers 11a, 11b. FIG. 2 shows that the received signals that are amplified by the amplifiers 13 are read parallel and via separate ports 14a, 14b into the micro-controllers 11a, 11b. For this, corresponding port lines 15 extend from the outputs of receivers 6 to each of the ports 14a, 14b of the two micro-controllers 11a, 11b. During operation of the light grid 1, the individual receivers 6 can therefore be activated continuously, so that the received signals are read simultaneously and via the ports 14a, 14b into both micro-controllers 11a, 11b.

An output circuit 17 with one or several circuit outputs is connected with the aid of further lines 16 to the micro-controller 11a, 11b outputs. Output circuit 17 may be used to give out an object detection signal generated in the evaluation unit, wherein the switching states of the object detection signal indicate whether or not an object is located in the monitored area.

An object is considered detected if at least one beam axis of the light grid 1 is interrupted, so that the transmitted light rays 2 can no longer travel to the corresponding receiver 6 via the beam axis.

For application in the area of safety technology, the light grid 1 is typically used for monitoring a danger zone around a machine. In the process, the object detection signal generated in the light grid 1 is read out to the machine. The machine is made operational only if the light grid 1 detects a clear monitored area during an error-free operation. Otherwise, the machine will be shut down.

The ports 14a, 14b on the micro-controllers 11a, 11b, which can be used in particular for reading in the signals received at the receiver 6, can optionally be operated as inputs or outputs. The micro-controllers 11a, 11b preferably are provided with so-called tri-state ports having three states (input, output, high-impedance switching).

While the light grid 1 is operational, the transmitters 3 are activated one after another with the transmission timing. On the receiver side, however, the receivers 6 are continuously activated and the signals received at the receivers 6 are conducted in parallel to the ports 14a, 14b of the two micro-controllers 11a, 11b.

To meet the safety-technical requirements, however, only that port 14a, 14b of a micro-controller 11a, 11b is respectively activated, onto which the signals are conducted that are received at the receiver 6, which is assigned to the respectively activated transmitter 3. The remaining ports 14a, 14b of the micro-controller 11a, 11b are muted, so that the signals received at the other receivers 6 cannot be read via these ports into the micro-controllers 11a, 11b. For this, the ports 14a, 14b and the port lines 15 to the receiver outputs can be switched to ground potential, wherein the correct switching operation is controlled by the micro-controller 11a, 11b itself. Alternatively, the ports 14a, 14b can also be connected to operating voltage potential.

The micro-controllers 11a, 11b themselves may be used for muting of the individual ports 14a, 14b and/or the port lines. Alternatively, an additional port may be assigned for the muting operation to each port 14a, 14b of a micro-controller 11a, 11b to which a signal is conducted. It is particularly advantageous if the function of the ports 14a, 14b of this pair of ports alternates cyclically, thereby uncovering static errors such as the sticking of a port 14a, 14b.

Muting the ports 14a, 14b ensures that even though all receivers are continuously activated, only the signals received at the receiver 6 are evaluated in the micro-controllers 11a, 11b with the timing of the transmitter activation, which are received by the receiver 6 that is assigned to the respectively active transmitter 3.

A precondition for this is that the muting of the ports 14a, 14b of the micro-controllers 11a, 11b occurs with the transmitting timing of the transmitters 3. At the start of a working cycle, an optical synchronizing between the receivers 6 and the transmitters 3 of the light grid 1 is furthermore required. Any beam axis of the light grid 1 can be used for this since unambiguous codes are imprinted onto the transmitted light rays 2 emitted by the transmitters 3.

The light grid 1 is synchronized by activating only one input of the evaluation unit and/or respectively one port 14a, 14b of the micro-controllers 11a, 11b, which is assigned to a receiver 6, wherein the additional inputs of the ports 14a, 14b assigned to the other receivers 6 are muted. This activated state of the receivers 6 is maintained until the receiver 6, for which the received signals are conducted onto the active ports 14a, 14b, receives the code for the associated transmitter 3. One precondition is that the codes of the transmitters 3 for the associated receivers 6 are input into the evaluation unit through programming or teach-in, prior to the startup of the light grid 1. Following this, the light grid 1 operation can continue, such that the transmitters 3 are activated with the transmitter timing and, synchronous to this, the ports 14a, 14b of the micro-controllers 11a, 11b are muted, such that only those ports 14a, 14b on the micro-controllers 11a, 11b remain active, meaning they are not muted, to which the signals are conducted which are received by the receiver 6 assigned to the respectively activated transmitter 3.

During the operation of the light grid 1, the signals received in the micro-controllers 11a, 11b are evaluated by checking whether the receivers 6 received the correct codes, in the sequence corresponding to the transmitter timing, meaning the codes for the transmitters 3 assigned thereto. For this, the codes received by the receivers 6 are respectively input into a toroidal core store in each micro-controller 11a, 11b.

The contents of the toroidal core stores are compared by using a mutual cyclical control to determine that the content is identical.

If this check is positive and if the codes of the individual transmitters 3 are received at the corresponding receivers 6 for all beam axes, then the light grid 1 operates correctly and the monitored area is clear. The object detection signal in that case occupies the switching state "clear monitored area." The operation of the machine, for which the danger zone is monitored with the light grid 1, is released with the aid of this object detection signal, meaning the machine operation is started by this object detection signal.

If an object enters the monitored area, at least one beam axis is interrupted, so that the receiver 6 of this beam axis can no longer receive the code from the associated transmitter 3. The object detection signal then occupies the switching state "object detected," which results in a shut-down of the machine operation.

The object detection signal occupies the same switching state if an internal light grid 1 error is discovered in the micro-controllers 11a, 11b.

In that case, errors caused by interconnections or short-circuits can also be detected through the muting of the ports 14a, 14b and the port lines 15 for the micro-controllers 11a, 11b in the transmitting cycle.

For example, if an interconnection occurs between two adjacent lines 15, so that the signals received by a receiver 6 are not conducted to the associated port 14a, 14b of a micro-controller 11a, 11b, but are erroneously conducted to the adjacent port, then a muting of the adjacent port (e.g. through switching to ground potential) prevents that the received signal, conducted incorrectly because of the interconnection, is sent to the micro-controllers 11a, 11b for evaluation. The active port 14a of the micro-controller 11a does not receive the signal because of the interconnection, whereas the port 14b of the second micro-controller 11b receives the signal. In that case, the toroidal core store contents of the micro-controllers 11a, 11b differs, which results in generating an error message. Based on this message, the object detection signal assumes the switching state "object detected," meaning the system changes to a different state, so that the machine operation is shut down.

The invention has been described in detail with respect to various embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. A method for detecting objects within a monitoring zone of a light grid including a predetermined number of transmitters transmitting light rays, a corresponding number of receivers respectively aligned with the transmitters, each aligned transmitter and receiver forming a beam axis each receiver having a receiver output and producing a received signal at the output, and an evaluation unit for generating an object detection signal in dependence on the received signals, wherein the received signals are coupled to separate, parallel inputs of the evaluation unit, the method comprising:
cyclically activating the transmitters, one after another;
impressing characterizing codes on the transmitting light rays of the individual transmitters;
simultaneously activating the receivers such that only the received signal from the receiver corresponding to the activated transmitter is recorded and stored in the evaluation unit by muting the inputs of the evaluation unit to which the received signals from the remaining receivers are coupled;
verifying the correctness of the codes impressed on the transmitting light rays by evaluating the stored received signals in the evaluation unit; and
verifying the sequence of received transmitting light rays by evaluating the stored received signals in the evaluation unit.

2. The method according to claim 1, wherein said impressing includes assigning a code generator to each transmitter to generate the code that is impressed on the transmitting light rays.

3. The method according to claim 1, wherein said cyclically activating the transmitters includes transmitting a signal from transmitter to transmitter.

4. The method according to claim 1, wherein said simultaneously activating the receivers includes storing the code for the associated transmitter in the evaluation unit.

5. The method according to claim 1, wherein said simultaneously activating the receivers includes performing an error-free evaluation of the received signals in the evaluation unit.

6. The method according to claim 1, wherein the method further comprises activating a single input of the evaluation unit, synchronizing the evaluation unit via the single input unit, reading the received signal at one of the receivers into the evaluation unit via the single input, and cyclically and successively activating each of the remaining inputs with the timing of the transmitter activation after the code for the receiver associated with the single input is received at the single input.

7. The method of claim 1, wherein impressing further comprises impressing an unambiguous, individual code onto each of the transmitting light rays of the individual transmitters.

8. The method according to claim 5, wherein the evaluation unit comprises two channels.

9. The method according to claim 8, wherein the evaluation unit includes two micro-controllers, which monitor each other, and the method further including conducting the received signals in parallel to the ports of both microcontrollers.

10. The method according to claim 9, wherein the method includes selectively operating the ports of each micro-controller operated optionally as inputs or outputs.

11. The method according to claim 9, wherein the method includes providing each micro-controller with a ring-type memory, and continuously writing the codes for the associated transmitters which are received by the individual receivers into the ring-type memories.

12. The method according to claim 9, wherein the method includes muting at least one of the ports by switching the at least one port to a ground potential.

13. The method according to claim 9, wherein the method includes muting at least one of the ports by switching the at least one port to an operating voltage potential.

14. The method according to claim 11, wherein the method includes checking the contents of the ring-type memories of the micro-controllers for uniformity.

15. The method according to claim 12, wherein the muting occurs internally, in the respective micro-controller.

16. The method according to claim 12, wherein the evaluation unit further includes an additional port adapted for muting another port.

17. The method according to claim 15, wherein the method further comprises controlling the status of the respective port with the aid of a read-back operation during the muting.

18. The method according to claim 16, wherein the method further includes selectively operating a first and a second port to read in the received signals and to mute the other port.

* * * * *